United States Patent [19]

Oetiker

[11] Patent Number: 5,000,233
[45] Date of Patent: Mar. 19, 1991

[54] METHOD AND MACHINE FOR AUTOMATICALLY MOUNTING AND TIGHTENING CLAMPS

[75] Inventor: Hans Oetiker, Horgen, Switzerland

[73] Assignee: Hans Oetiker AG Maschinen- und Apparatefabrik, Horgen, Switzerland

[21] Appl. No.: 472,287

[22] Filed: Jan. 30, 1990

[51] Int. Cl.⁵ ............................................. B21F 9/02
[52] U.S. Cl. ...................................... 140/150; 29/450
[58] Field of Search ................... 29/450, 505; 81/9.3; 140/93 A, 93.2, 93.4, 150

[56] References Cited

U.S. PATENT DOCUMENTS

| | | | |
|---|---|---|---|
| 633,790 | 9/1899 | Burgher | 81/9.3 |
| 3,257,874 | 6/1966 | Madeira | 140/93.4 |
| 3,810,495 | 5/1974 | Pack | 140/93 A |

Primary Examiner—Lowell A. Larson
Attorney, Agent, or Firm—Paul M. Craig, Jr.

[57] ABSTRACT

A method and apparatus for mounting and tightening an open clamp about an object to be fastened in which a first jaw-like member causes the band end portion intended to constitute the inner band portion to be placed about the object to be fastened, a second jaw-like member then causes the other band end portion of the clamp intended to constitute the outer band portion to be placed about the object to be fastened in such a manner that the outwardly extending hook or hooks in the inner band portion is or are adapted to engage with the corresponding aperture or apertures in the outer band portion. Two further jaw-like members each having pincer-like nose portions at the free ends are then actuated to engage with the outwardly extending leg portions of a plastically deformable ear in the clamping band to plastically deform the latter after the mechanical connection by engagement of the outwardly extending hook or hooks in the corresponding aperture or apertures is established, to tighten the clamp about the object to be fastened. A holding device thereby holds the clamp in position until the first and second jaw-like members have been actuated and assume the holding function to permit release of the clamp by the holding device. Operation of the machine is fully automatic by appropriate sequence controls of fluid-actuated piston and cylinder units.

40 Claims, 4 Drawing Sheets

METHOD AND MACHINE FOR AUTOMATICALLY MOUNTING AND TIGHTENING CLAMPS

FIELD OF INVENTION

The present invention relates to a method and machine for mounting and tightening clamps about objects to be fastened thereby, and more particularly to a method and machine for fully automatically mounting and tightening clamps supplied in the open condition about objects to be fastened thereby, such as axle boots.

BACKGROUND OF THE INVENTION

Machines for automatically mounting and tightening clamps about objects to be fastened thereby are disclosed in my copending application Ser. No. 07/016,794, filed Feb. 20, 1987 and entitled "Apparatus and Method for Automatically Installing and Fastening Clamps Onto Objects To Be Fastened" (now abandoned) and in my copending application Ser. No. 07/160,004, filed Feb. 24, 1988 and entitled "Apparatus and Method for Automatically Installing Clamps." In these aforementioned copending applications, a flat blank is deformed at a deformation station into a circular clamp corresponding substantially to the outer configuration of the object to be fastened thereby. The thus-deformed clamp which is locked in its circular configuration at the deformation station, is then transferred by a transfer mechanism from the deformation station to be placed over the object to be fastened and is finally tightened about the object to be fastened by plastic deformation of a so-called "Oetiker" ear. The machines disclosed in my aforementioned copending applications have proved highly successful. However, in some instances, it may be desirable to mount an open clamp directly about the object to be fastened and to mechanically connect the overlapping ends of the clamp and tighten the same only after it is placed about the object to be fastened.

SUMMARY OF THE INVENTION

It is therefore a primary object of the present invention to provide a method and machine for fully automatically mounting an open clamp directly over the object to be fastened and to tighten the thus-mounted clamp while it is held in place over the object to be fastened.

Another object of the present invention resides in a machine for automatically mounting and tightening open clamps over objects to be fastened which is simple in construction, reliable in operation and capable of fully automated operation.

A further object of the present invention resides in a machine of the type described above which utilizes pivotally mounted jaw-like members carried together with their pneumatic actuators on a slidable support structure with which they form a compact subassembly.

A still further object of the present invention resides in a machine of the type described above which readily lends itself to automated sequence control utilizing conventional control devices for sequentially actuating and deactivating pneumatic piston-cylinder units.

Another object of the present invention resides in a machine tool of simple construction and constituted by relatively few simple parts which is capable of applying an open clamp, preferably a predeformed clamp about the object to be fastened thereby and to tighten the clamp once applied about the object to be fastened.

The underlying problems are solved according to the present invention in that a first jaw-like member which is pivotally supported on a support structure and which is actuatable by a fluid-operated actuator, initially applies the free band end intended to constitute the inner band portion about the object to be fastened. A second jaw-like member is also pivotally supported on the support structure in such a manner that upon actuation thereof by a fluid-operated actuator, it will apply the opposite end portion of the band intended to form the outer overlapping band portion about the object to be fastened in overlapping relationship with the previously applied inner band portion in such a manner that the mechanical connection consisting of one or more outwardly extending hooks in the inner band portion can engage in a corresponding aperture or apertures provided in the outer band portion. Two further jaw-like members which are preferably operated in unison from a common fluid-operated actuator then finally engage with their pincer-like nose portions the outwardly extending leg portions of a typical "Oetiker" plastically deformable ear to plastically deform the same after the outwardly extending hook or hooks have engaged in the corresponding aperture or apertures, so as to tighten the clamp about the object to be fastened.

According to another feature of the present invention, the holding device for holding the clamp to mount the same about the object to be fastened is operated by a fluid-operated actuator which holds the clamp in its approximate middle section by oppositely disposed clamp-retaining finger members, of which one may be fixed and the other movable so as to be able to selectively hold and release the clamp. These clamp-retaining finger members thereby engage the clamp along its opposite narrow sides of the clamping band corresponding to the thickness dimension thereof.

According to still another feature of the present invention, the jaw-like members, their actuators as well as the holding device are all mounted on a common support structure to form therewith a subassembly slidable relative to a fixed base or frame so that the subassembly together with the clamp retained by the holding device can be moved from an inoperative starting position spaced from the object to be fastened toward and into close proximity to the object to be fastened.

According to a further feature of the present invention, the jaw-like members are provided with curved internal engaging surfaces conforming approximately to the rounded-off portions of a reniform predeformed clamp whose predeformed curved portions also conform approximately to the outer surface of the cylindrical object to be fastened.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
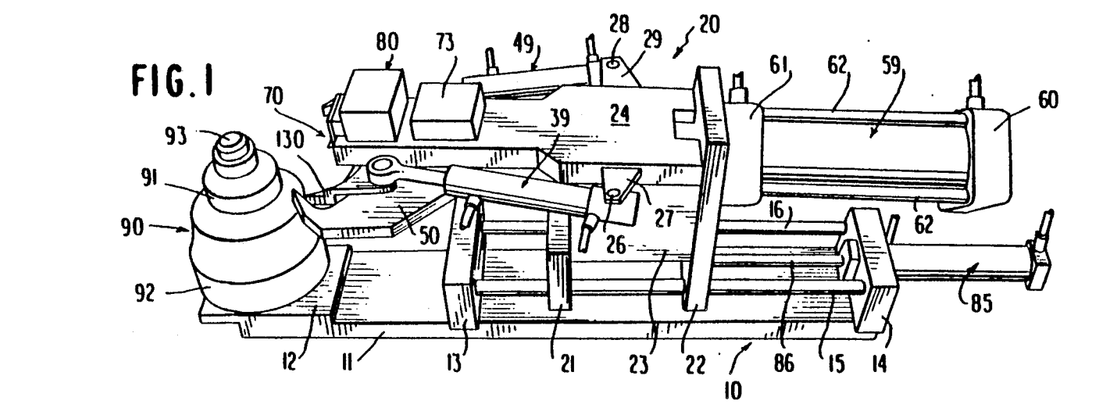
FIG. 1 is a somewhat schematic perspective view illustrating a machine in accordance with the present invention for mounting and tightening a clamp about an object to be fastened thereby.

Referring now to the drawing wherein like reference numerals are used throughout the various views to designate like parts, and more particularly to FIG. 1, reference numeral 10 generally designates a relatively fixed machine part, for example, part of the machine frame which is only schematically indicated in this figure by the flat base 11 which may be, for example, the top of a machine housing containing the sequence controls of any known conventional construction and forming no part of the present invention. The flat base 11 is provided at its left end with a pedestal 12 where the clamp is mounted about an object to be fastened as will be described more fully hereinafter. However, the flat base 11 and pedestal 12, shown only to explain the principle of operation of the machine of this invention, may be modified in any appropriate manner to conform to the requirements of the machine in its intended environment.

Transverse frame members 13 and 14 fixedly mounted on the base 11 carry support rods 15 and 16 on which is slidably mounted a clamp mounting and tightening tool subassembly generally designated by reference numeral '20. The subassembly 20 includes two upright plate-like support members 21 and 22 arranged on both sides of two spaced side plates of which only side plate 23 is shown. A mounting support plate 24 is carried by the side plates which are all of suitable thickness and fixedly secured to the upright support members 21 and 22.

The clamp mounting and tightening tool subassembly 20 further includes a first jaw-like member generally designated by reference numeral 30 (FIG. 4) which is of generally triangular shape. One leg 31 of the first jaw-like member 30 is provided with a rounded-off internal clamp-engaging surface 32 conforming approximately to a part of the configuration of the object to be fastened. The surface 32 is provided with a recess 33 to accommodate the outwardly extending hook or hooks, for example, such as hooks 32 and 31 in the inner band portion as shown in my prior U.S. Pat. No. 4,299,012. The other leg 34 of the first jaw-like member 30 is pivotally connected about a central pivot support 35 which is fixedly mounted on the support plate 24. The apex 36 of the generally triangularly shaped first jaw-like member 30 is pivotally connected at 37 with the free end of a piston rod 38 of a pneumatic piston-cylinder unit generally designated by reference numeral 39 which constitutes the actuator for the first jaw-like member and whose cylinder housing is pivotally connected at 26 to the support lug or bracket 27 fixed to the support plate 24.

Figure 4:
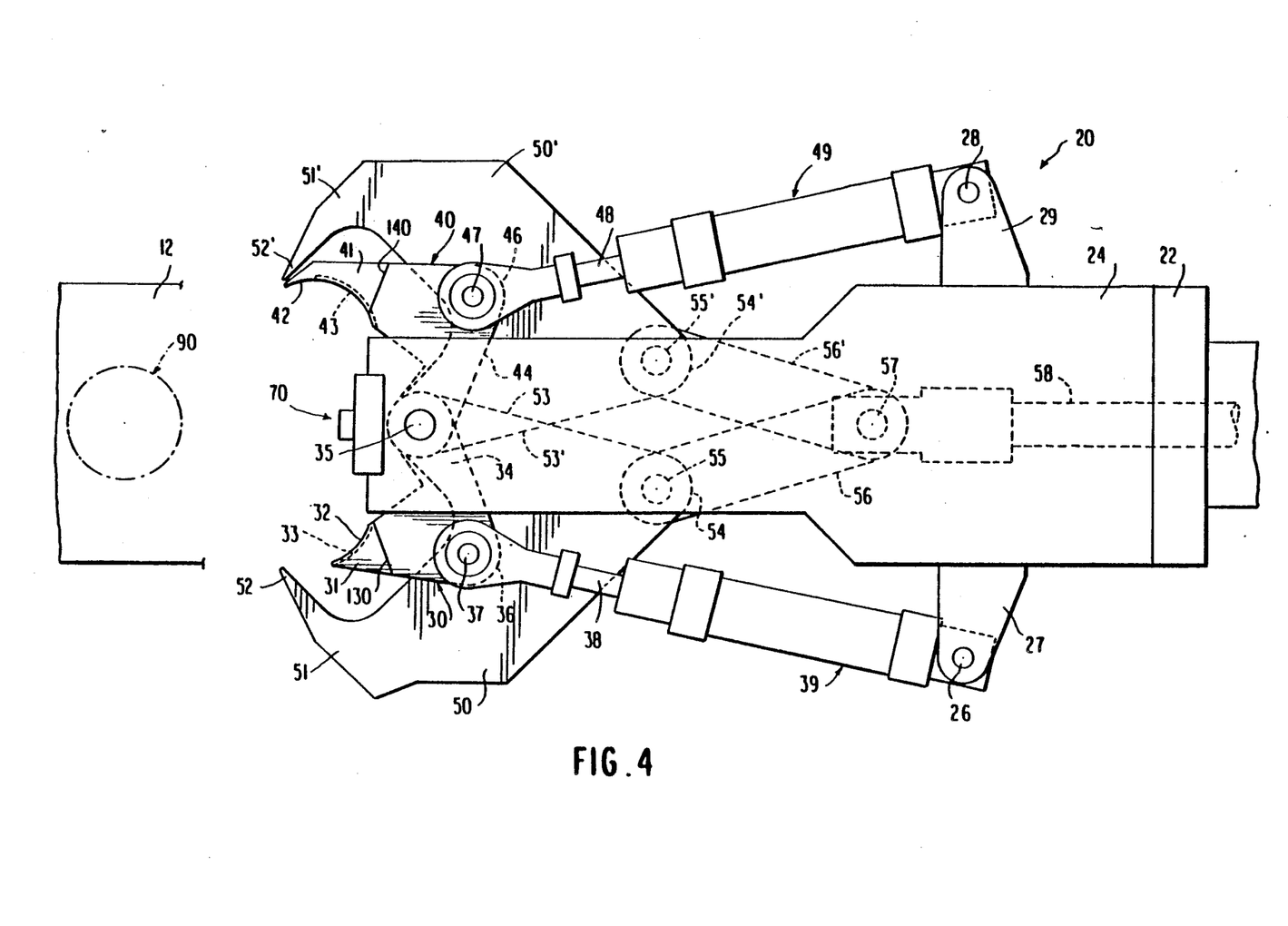
FIG. 4 is a partial top plan view illustrating the machine tool subassembly of the machine in accordance with the present invention and more particularly the parts thereof in the retracted starting position before a clamp is fed to the holding device.

A second jaw-like member generally designated by reference numeral 40 also of generally triangular shape has one leg 41 provided with a rounded-off internal clamp-engaging surface 42 recessed at 43 to accommodate the channel-shaped depression, such as central depression 63 of my aforementioned prior U.S. Pat. No. 4,299,012 forming part of the so-called stepless feature. The other leg 44 of the generally triangularly shaped second jaw-like member 40 is also pivotally connected about the central pivot support 35 while the apex 46 of the second jaw-like member 40 is pivotally connected at 47 with the free end of the piston rod 48 of a pneumatic piston-cylinder unit generally designated by reference numeral 49 which constitutes the actuator for the second jaw-like member and whose cylinder housing is pivotally connected at 28 with a lug or bracket 29 fixed to the support plate 24.

The tool subassembly 20 further comprises two jaw-like members 50 and 50' again of generally triangular shape whose one leg portions 51 and 51' include pincer-like nose portions 52 and 52' operable to plastically deform the "Oetiker" ear. Each of the other leg portions 53 and 53' of the further jaw-like members 50 and 50' are also pivotally connected at the central pivotal support 35. The apices 54 and 54' of the further jaw-like members 50 and 50' are pivotally connected at 55 and 55' to a respective connecting lug 56 and 56' whereby the opposite ends of the connecting lugs 56 and 56' are pivotally connected in a common pivotal connection 57 to the free end of a piston rod 58 of a pneumatic piston-cylinder unit generally designated by reference numeral 59 (FIG. 1) which is supported on the upright support member 22 by support brackets 60 and 61 with the use of support rods 62 and which constitutes the actuator for the two further jaw-like members 50 and 50'.

The clamp holding device generally designated by reference numeral 70 includes a lower fixed clamp-retaining finger member 71 (FIGS. 2 and 3) and an upper movable clamp-retaining finger member 72 pivotally connected in housing 73 (FIG. 2) at the pivotal connection 74 by way of the longitudinally extending member 75. The movable clamp-retaining structure 72, 75 is biased in the upward disengaging direction of the holding device 70 by a spring 76. In order to hold the clamping band 101 along its opposite narrow sides in proper position within the holding device 70, a backstop 77 is provided and the clamp-engaging surfaces 78 and 79 of the clamp-retaining finger members 71 and 72 are bevelled so as to urge the clamping band 101 against the backstop 77.

Figure 2:
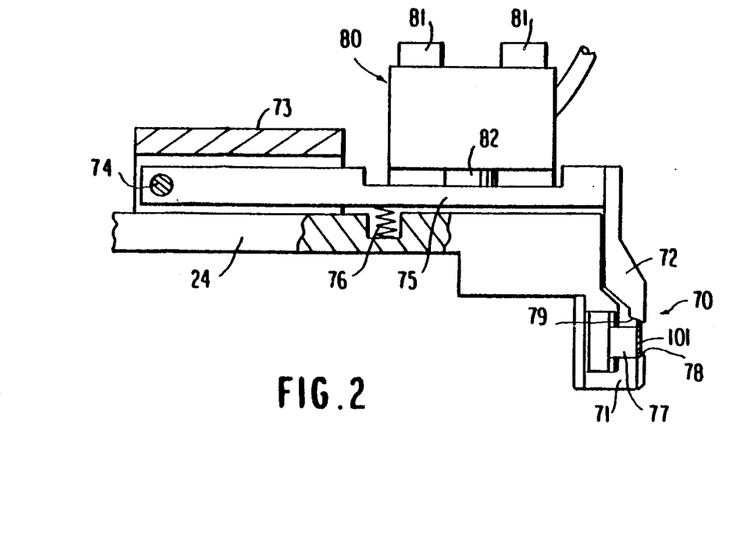
FIG. 2 is a side elevational view, on an enlarged scale and partly in cross section, of the holding device in accordance with the present invention for holding the clamp in position.
Figure 3:
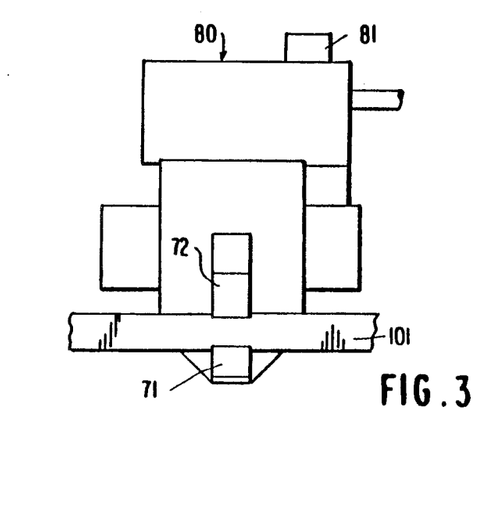
FIG. 3 is a side elevational view of the holding device of FIG. 2

A pneumatically operated piston-cylinder unit generally designated by reference numeral 80, which constitutes the actuator for the clamp holding device, is secured to the support plate 24 by bolts 81 and is operable upon actuation thereof by the extending movement of its piston rod 82 to displace the movable clamp-retaining structure 72, 75 in the engaging, i.e., clockwise pivotal direction.

The slidable subassembly 20 is adapted to be slidably selectively displaced by the pneumatic piston-cylinder unit 85 (FIG. 1) whose piston rod 86 extends through the transverse frame member 14 and is connected at its free end with the upright support member 22.

The object to be fastened generally designated by reference numeral 90 is an axle boot in the illustrated embodiment made, for example, of silicon rubber or "Hytrell" plastic material and includes a cylindrical surface 91 about which a clamp is to be mounted so as to fasten the object 90 about a fixed member 93.

The clamp generally designated by reference numeral 100 (FIG. 5) may be of the type as shown and disclosed in my prior U.S. Pat. No. 4,299,012 or of the type as shown and disclosed in my copending application Ser. No. 06/922,473, filed on Oct. 23, 1986 and entitled "Hose Clamp," the subject matter of which is incorporated herein. The clamp structure which is preferably predeformed into reniform shape, for example, by the use of an apparatus as disclosed in my prior U.S. Pat. No. 4,425,781, consists of a clamping band adapted to be held in position along its narrow sides by the holding device 70 which engages the clamping band substantially in the center of its rectilinear clamping band part 101. The predeformed end portion 102 of the clamping band, which is intended to form the inner clamping band end portion and is predeformed to approximately the configuration of the object 90 to be fastened, includes one or more outwardly extending hooks 104 adapted to engage in corresponding apertures (not shown) provided in the free end portion 103' of the predeformed clamping band end portion 103 intended to constitute the outer overlapping band portion. The latter includes a typical "Oetiker" ear 105 preferably provided with a reinforcing groove or shallow depression as disclosed in my copending application Ser. No. 06/922,408, filed Oct. 23, 1986 and entitled "Deformable Ear For Clamps," the subject matter of which is incorporated herein. In order to provide a so-called stepless feature, i.e., an internal surface of the installed clamp structure devoid of any steps or gaps, the inner band portion 102 is provided with a tongue-like extension 107 adapted to engage in the central pressed-out channel 108 defined by steps 109 and 109' as more fully disclosed in my prior U.S. Pat. No. 4,299,012.

Furthermore, in order to permit free pivotal movements of the two jaw-like members 30 and 40 and of the two further jaw-like members 50 and 50' about the same pivotal connection 35 without mutual interference, yet permit the clamp-engaging parts 31, 41, 51 and 51' to operate in the same horizontal plane, the jaw-like members 30 and 40 are provided with steps 130 and 140 (FIGS. 4-8), step 130 being shown also in the perspective view of FIG. 1. Additionally, the areas where the legs 34 and 44 of the jaw-like members 30 and 40 are pivoted at 35 may be mutually offset in the vertical direction. Similarly, the areas where the legs 53 and 53' of the jaw-like members 40 and 40' are pivoted at 35 may also be mutually offset in the vertical direction. This can be achieved, for example, by decreasing the normal thickness of the jaw-like members within these areas by about one-half (not shown), so that the main parts of jaw-like members 30 and 40 operate in one horizontal plane and the main parts of jaw-like members 50 and 50' operate in another horizontal plane disposed below the horizontal plane of the jaw-like members 30 and 40. For the sake of simplicity, these offset arrangements are not shown in the drawing.

OPERATION

The operation of the machine in accordance with the present invention is fully automatic by the use of a pneumatic medium under pressure controlled by appropriate conventional sequence controls utilizing known parts and forming no part of the present invention. For that reason and for the sake of simplicity, only the ends of the lines connected to the pneumatic piston-cylinder units constituting the actuators for the various movable parts of the machine in accordance with the present invention are shown schematically in the drawings.

FIG. 4 illustrates the machine tool subassembly 20 in accordance with the present invention in its retracted starting position, i.e., in the right end position as viewed in this figure, with all of the jaw-like members 30, 40, 50 and 50' in their fully open position. In this position a clamp, preferably predeformed into reniform shape is then fed to the holding device 70 either manually or by conventional automatic means and is held in position (not shown in this figure) by actuation of the pneumatic actuator 80 which causes the movable clamp-retaining finger member 72 to pivot clockwise about the pivotal connection 74 as the piston rod 82 is extended. As a result thereof, the clamping band is securely held in place in its rectilinear part 101 (FIG. 5) against the backstop 77 by the clamp-engaging surfaces 78 and 79.

Figure 5:
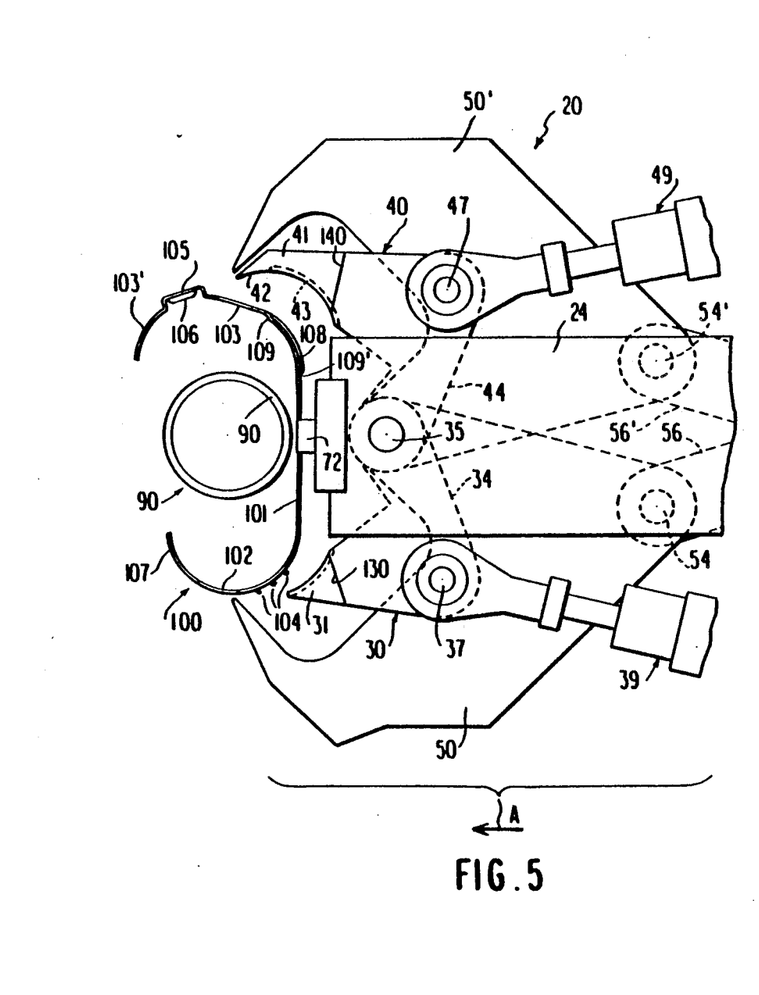
FIG. 5 is a partial top plan view of the machine tool subassembly of FIG. 4, illustrating the parts thereof in the position when the machine tool subassembly has been displaced from the starting position of FIG. 4 toward its extended position in proximity of the object to be fastened and showing also a reniform predeformed clamp held by the holding device.

Next, the pneumatic actuator 85 is actuated to displace the tool subassembly 20 toward the object 90 to be fastened, i.e., toward the left in FIG. 1, as indicated by arrow A in FIG. 5. The position of the tool subassembly 20 after it has reached its extended left end position during this step of operation, is illustrated in FIG. 5.

Figure 6:
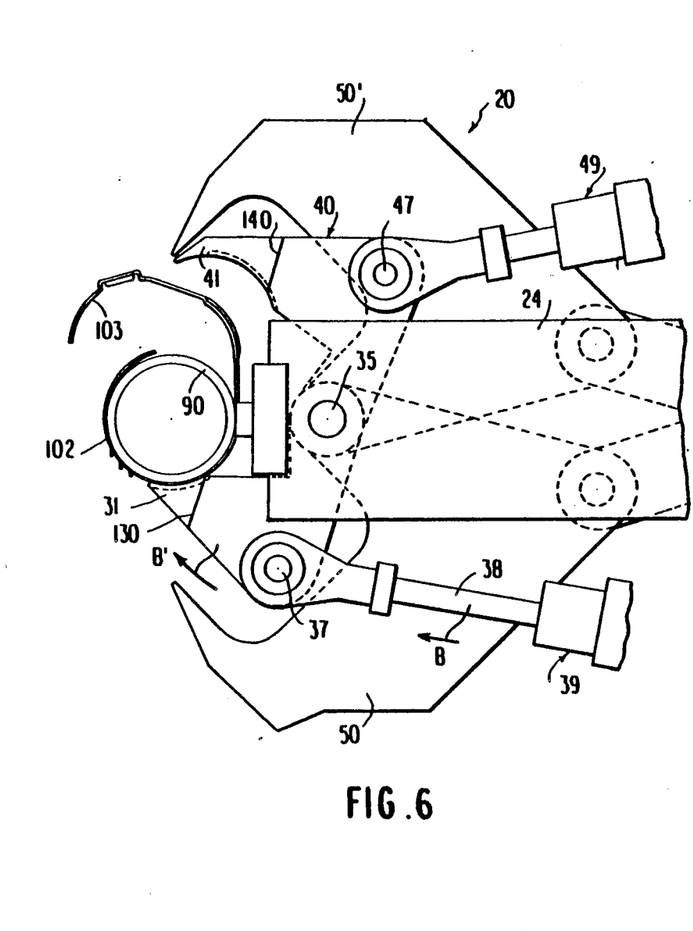
FIG. 6 is a top plan view, similar to FIG. 5, and illustrating the next step of operation of the machine tool subassembly in which a first jaw-like member applies the end portion of the clamping band intended to form the inner band portion about the object to be fastened thereby.

Next, the pneumatic actuator 39 is actuated so as to extend the piston rod 38 which, as a result of the pivotal connection and configuration of the first jaw-like member 30 causes the latter to engage with the part 102 of the band intended to form the inner band portion. This operating step is indicated in FIG. 6 by arrows B, B', FIG. 6 illustrating the extended end position of the piston rod 38 and therewith of the first jaw-like member 30.

Figures 7, 8, 9:
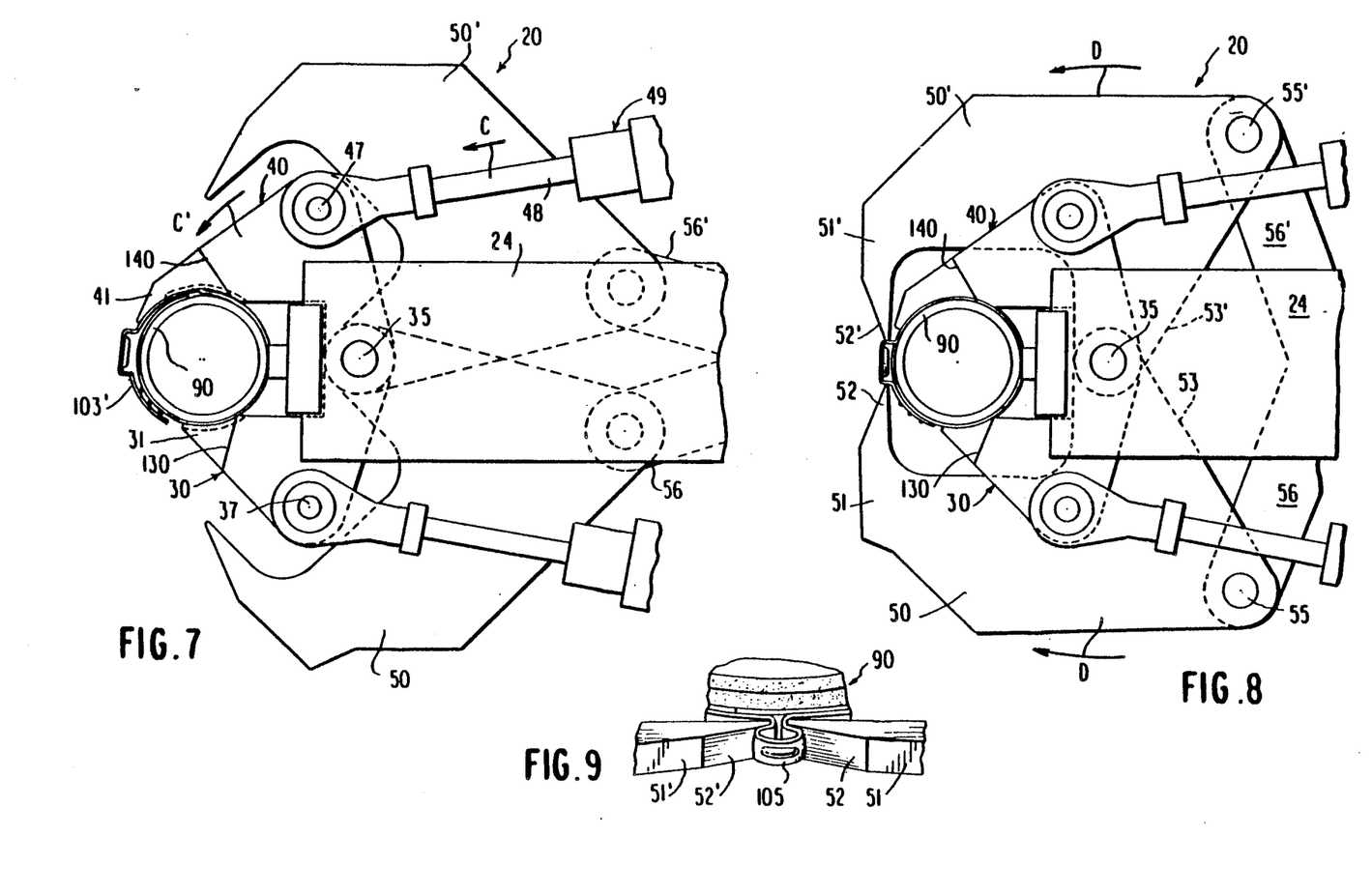
FIG. 7 is a top plan view, similar to FIG. 6, and illustrating the next step of operation of the machine tool subassembly, in which the second jaw-like member has been actuated to place the other band portion intended to constitute the outer band portion about the object to be fastened.
FIG. 8 is a top plan view similar to FIG. 7 and illustrating the following operation of the machine tool subassembly, in which two further jaw-like members with pincer-like nose portions have just engaged the leg portions of the plastically deformable "Oetiker" ear.
FIG. 9 is a partial perspective view, on an enlarged scale, from in front of the object to be fastened and showing the position of the pincer-like nose portions of the two further jaw-like members as they have completed tightening the clamping band about the object to be fastened by plastically deforming the "Oetiker" ear.

During the next operating step, the pneumatic actuator 49 is actuated to cause its piston rod 48 to be extended as indicated by arrow C in FIG. 7 which in turn causes the second jaw-like member 40 to engage with the band portion 103 and place the same about the object to be fastened in the position as shown in FIG. 7, in which the hooks 104 (FIG. 5) are aligned and are normally able to engage with the corresponding apertures (not shown) provided in the overlapping outer band portion 103.

During the next operating step, the pneumatic actuator 80 is deactivated to deactivate the holding device 70, which is no longer required because the clamp is now held in position loosely about the object 90 to be fastened by the first and second jaw-like members 30 and 40. Next, the pneumatic actuator 59 is actuated causing the piston rod 58 to be extended, which in turn causes pivotal movement by way of linkages 56 and 56' on the part of the two further jaw-like members 50 and 50' so as to cause their pincer-like nose portions 52 and 52' to engage with the leg portions of the "Oetiker" ear. The arrangement is thereby preferably made in such a manner that the nose portion 52' will contact the corresponding leg portion of the "Oetiker" ear shortly before the nose portion 52 contacts its corresponding leg portion so as to assure that the outwardly extending hook or hooks 104 are engaged in the corresponding apertures before the clamp is tightened, should such engagement not have taken place upon completion of the operating steps C, C' in FIG. 7. The final position of the further jaw-like members 50 and 50' is shown in FIG. 9 in which the pincer-like nose portions 52 and 52' have plastically deformed the "Oetiker" ear 105 in the usual manner. At this point, the clamp is tightly installed about the object 90 to be fastened thereby. Upon completion of the installation, initially the pneumatic actuator 59 is deactivated so as to retract the piston rod 58 and thereby open the jaw-like members 50 and 50'. Thereafter, the pneumatic actuators 49 and 39 are deactivated in this sequence to open first the jaw-like member 40 and thereafter the jaw-like member 30 and the pneumatic actuator 85 is then deactivated to retract the tool subassembly 20 to its starting position of FIG. 4.

If a second clamp is to be installed about the same object, for example, about the cylindrical surface 92 of the axle boot, it is only necessary to move the object 90 to be fastened to another position where a similar automated mounting and tightening machine tool subassembly is provided, designed to conform to the larger diametric dimensions of the cylindrical surface 92. It is therefore to be understood that FIG. 1 only illustrates in a somewhat schematic manner one station of an automatic machine in accordance with the present invention which may be provided with as many stations as necessary, utilizing the principles of operations and parts associated therewith which are based on the principle as disclosed herein. Additionally, the type of object which can be fastened by a machine in accordance with the present invention is not limited to an axle boot, but is applicable to any other object to be fastened by a clamp structure of the type utilizable with the machine of the present invention. Additionally, the clamp structure is not limited to those mentioned hereinabove but may be, for example, a balanced clamp structure as disclosed in my copending application Ser. No. 07/446,700, filed Dec. 6, 1989 and entitled "Balanced Clamp Structure" which, for example, in FIG. 3 describes an open clamp provided with oppositely disposed ears as well as other measures to assure the balanced condition of the clamp structure. The subject matter of this last-mentioned application is also incorporated herein by reference.

Additionally, the deformation apparatus, for example as disclosed in my prior U.S. Pat. No. 4,425,781 may be incorporated in the automatic machine of the present invention whereby the deformed clamp is then fed to the machine tool subassembly 20 in its position illustrated in FIG. 4 by any conventional means before the described cycle of operation is commenced.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A machine for automatically affixing onto an object to be fastened thereby an open clamp structure formed by clamping band means having at least one outwardly extending hook means within the area of the clamping band means intended to form an inner band portion, at least one corresponding aperture means for engagement by said hook means and located within the area of the clamping band means intended to form an outer band portion overlapping the inner band portion when the clamp structure is installed about the object to be fastened thereby, and tightening means in said clamping band means for tightening said clamp structure about the object to be fastened thereby, said tightening means being located in said clamping band means on the side of said aperture means opposite the free end of the outer band portion, comprising means for holding the clamp structure in predetermined position relative to the object to be fastened, first jaw-like means operable to urge that part of the clamping band means including the inner band portion about the object to be fastened, second jaw-like means operable to urge that part of the clamping band means including the outer band portion about the object to be fastened and to prepare for engagement of the hook-like means in the aperture means, further jaw-like means operable to engage with the tightening means to tighten the clamp structure about the object to be fastened, and actuating means for actuating said holding means, said first jaw-like means, said second jaw-like means and said further jaw-like means in predetermined sequence.

2. A machine according to claim 1, wherein said tightening means includes a plastically deformable ear means having two generally outwardly extending leg portions interconnected by a bridging portion.

3. A machine according to claim 2, wherein said further jaw-like means includes two mutually oppositely directed pincer-like means operable to engage with the leg portions of the ear means to plastically deform the latter and thereby contract the clamp structure.

4. A machine according to claim 3, wherein the actuating means includes a first actuator for said first jaw-like means, a second actuator for said, second jaw-like means, a third actuator for said holding means, and at least one further actuator for said further jaw-like means.

5. A machine according to claim 4, wherein said further actuator is operable to actuate in unison the two pincer-like means of the further jaw-like means.

6. A machine according to claim 5, wherein said further actuator is a piston-cylinder unit operated by a fluid medium under pressure.

7. A machine according to claim 6, wherein said further actuator is a pneumatically operated piston-cylinder unit operating under predetermined pneumatic pressure so as to close the plastically deformable ear means with predetermined force.

8. A machine according to claim 7, wherein the clamp structure, as received by said holding means, is predeformed at least in part, to conform approximately to the general external configuration of the corresponding portion of the object to be fastened.

9. A machine according to claim 8, wherein the object to be fastened has generally cylindrical surfaces, and wherein the first and second jaw-like means include internal surface portions corresponding at least approximately to the generally cylindrical surfaces.

10. A machine according to claim 9, wherein the clamp structure, as received by said holding means, is of generally reniform shape, and wherein the holding means is operable to securely hold the generally reniform-shaped clamp structure within the center area of its rectilinear portion.

11. A machine according to claim 10<, wherein said clamping band means has predetermined width and thickness, and wherein said holding means is operable to hold the clamp structure by engaging opposite narrow sides of the clamping band means formed by its thickness.

12. A machine according to claim 11, further comprising a relatively fixed frame means, mounting support means slidable on said frame means, means for mounting said first and second jaw-like means, said further jaw-like means, and said first, second and further actuators on said mounting support means, and a still further actuator for slidably moving said mounting support means toward and away from the object to be fastened.

13. A machine according to claim 12, wherein said holding means and the third actuator are also mounted on said mounting support means.

14. A machine according to claim 12, wherein the piston rod of the piston-cylinder unit of the further actuator is so pivotally connected with the two further jaw-like means and the latter are so connected with the mounting support means that extension of the piston rod will cause the two pincer-like means to carry out a pincer-like closing movement with their free ends.

15. A machine according to claim 14, wherein the piston rod of the piston-cylinder unit of the first actuator is so connected with the first jaw-like means and the first jaw-like means is so connected with the mounting support means that extension of the last-named piston rod will cause the first jaw-like means to engage with the corresponding portion of the clamping band means to place and temporarily hold the corresponding portion about the object to be fastened.

16. A machine according to claim 15, wherein the piston rod of the piston-cylinder unit of the second actuator is so connected with the second jaw-like means and the second jaw-like means is so connected with the mounting support means that extension of the last-named piston rod will cause the second jaw-like means to engage with the corresponding portion of the clamping band means to place the last-mentioned corresponding portion about the object to be fastened and bring the outer band portion with its aperture means into overlapping relationship with the inner band portion in such a manner as to enable engagement of the hook means in the aperture means.

17. A machine according to claim 16, wherein said mounting support means, said holding means, said first and second jaw-like means, said further jaw-like means, and the actuators for said holding means, said first and second jaw-like means and said further jaw-like means form a displaceable subassembly.

18. A machine according to claim 16, wherein said actuating means includes sequence control means for actuating the actuator of said holding means to hold fast a clamp structure, thereafter actuating the actuator of the first jaw-like means, thereupon actuating the actuator for said second jaw-like means, then deactivating the holding means, then actuating the actuator of the further jaw-like means, thereafter deactivating the actuator of said further jaw-like means, thereupon deactivating the actuator for the second jaw-like means and thereafter deactivating the actuator for said first jaw-like means.

19. A machine according to claim 18, wherein said sequence control means is operable to actuate the still further actuator after actuation of the holding means and before actuation of the first actuator to move the mounting support means together with the parts mounted thereon toward the object to be fastened and for deactivation of the still further actuator after deactivation of all the other actuators.

20. A machine according to claim 1, wherein the actuating means includes a first actuator for said first jaw-like means, a second actuator for said second jaw-like means, a third actuator for said holding means, and at least one further actuator for said further jaw-like means.

21. A machine according to claim 20, wherein said further actuator is operable to actuate the further jaw-like means in unison.

22. A machine according to claim 21, wherein said further actuator is a pneumatically operated piston-cylinder unit operating under predetermined pneumatic pressure so as to close the plastically deformable ear means with predetermined force.

23. A machine according to claim 20, further comprising a relatively fixed frame means, mounting support means slidable on said frame means, means for mounting said first and second jaw-like means, said further jaw-like means, and said first, second and further actuators on said mounting support means, and a still further actuator for slidably moving said mounting support means toward and away from the object to be fastened.

24. A machine according to claim 23, wherein said holding means and the third actuator are also mounted on said mounting support means.

25. A machine according to claim 24, wherein said mounting support means, said holding means, said first and second jaw-like means, said further jaw-like means, and the actuators for said holding means, said first and second jaw-like means and said further jaw-like means form a displaceable subassembly.

26. A machine according to claim 20, wherein the piston rod of the piston-cylinder unit of the further actuator is so pivotally connected with the two further jaw-like means and the latter are so connected with the mounting support means that extension of the piston rod will cause the two pincer-like means to carry out a pincer-like closing movement with their free ends.

27. A machine according to claim 20, wherein the piston rod of the piston-cylinder unit of the first actuator is so connected with the first jaw-like means and the first jaw-like means is so connected with the mounting support means that extension of the last-named piston rod will cause the first jaw-like means to engage with the corresponding portion of the clamping band means to place and temporarily hold the corresponding portion about the object to be fastened.

28. A machine according to claim 20, wherein the piston rod of the piston-cylinder unit of the second actuator is so connected with the second jaw-like means and the second jaw-like means is so connected with the mounting support means that extension of the last-named piston rod will cause the second jaw-like means to engage with the corresponding portion of the clamping band means to place the last-mentioned corresponding portion about the object to be fastened and bring the outer band portion with its aperture means into overlapping relationship with the inner band portion in such a manner as to enable engagement of the hook means in the aperture means.

29. A machine according to claim 20, wherein said actuating means includes sequence control means for actuating the actuator of said holding means to hold fast a clamp structure, thereafter actuating the actuator of the first jaw-like means, thereupon actuating the actuator for the second jaw-like means, then deactivating the actuator for the holding means, then actuating the actuator of the further jaw-like means, thereafter deactivating the actuator of said further jaw-like means, thereupon deactivating the actuator for the second jaw-like means and thereafter deactivating the actuator for said first jaw-like means.

30. A machine according to claim 29, wherein said sequence control means is operable to actuate the still further actuator after actuation of the holding means and before actuation of the first actuator to move the mounting support means together with the parts mounted thereon toward the object to be fastened and for deactivation of the still further actuator after deactivation of all the other actuators.

31. A machine according to claim 1, wherein the clamp structure, as received by said holding means, is predeformed to conform at least in part approximately to the general external configuration of the corresponding portion of the object to be fastened.

32. A machine according to claim 1, wherein the object to be fastened has at least in part generally cylindrical surfaces, and wherein the first and second jaw-like means include internal surface portions corresponding at least approximately to the at least in part generally cylindrical surfaces.

33. A machine according to claim 32 wherein the clamp structure, as received by said holding means, is of generally reniform shape, and wherein the holding means is operable to securely hold the generally reniform-shaped clamp structure within the center area of its rectilinear portion.

34. A method for automatically mounting and tightening an open clamp with band portions intended to form inner and outer band portions about an object to be fastened, comprising the steps of firmly holding the clamp, engaging the band portion intended to constitute the inner band portion to place the same about the object to be fastened, thereafter engaging the band portion intended to constitute the outer band portion in such a manner that a mechanical connection including at least one hook in the inner band portion is adapted to engage in a corresponding aperture provided in the outer band portion, releasing the previously held clamp, now held about the object to be fastened, and thereafter plastically deforming an ear provided in the outer band portion to tighten the clamp about the object to be fastened.

35. A method according to claim 34, further comprising the step of starting a cycle of operation with the parts of a subassembly in a retracted position, thereafter displacing the subassembly toward the object to be fastened until the part of the clamp held in position is in close proximity to the object to be fastened whereupon the further operating steps are undertaken until the clamp is tightened about the object to be fastened thereby.

36. A method for automatically mounting and tightening an open clamp with band portions intended to form inner and outer band portions about an object to be fastened, comprising the steps of firmly holding the clamp in a holding device, engaging the band portion intended to constitute the inner band portion by a first jaw-like member to place the same about the object to be fastened, thereafter engaging the band portion intended to constitute the outer band portion by a second jaw-like member in such a manner that a mechanical connection including at least one hook in the inner band portion is adapted to engage in a corresponding aperture provided in the outer band portion, releasing the previously held clamp, now held about the object to be fastened by the jaw-like members, and thereafter plastically deforming an ear provided in the outer band portion to tighten the clamp about the object to be fastened.

37. A method according to claim 36, further comprising the step of starting a cycle of operation with the parts of a subassembly in a retracted position in which a clamp can be gripped by the holding device, thereafter displacing the subassembly toward the object to be fastened until the part of the clamp held in position is in close proximity to the object to be fastened whereupon the further operating steps are undertaken until the clamp is tightened about the object to be fastened thereby.

38. A method according to claim 37, further comprising the step of opening further jaw-like members closed for closing the plastically deformable ear, thereafter sequentially opening the second and first jaw-like members, and finally retracting the subassembly.

39. A method according to claim 38, wherein pincer-like nose portions in the further jaw-like members operable to close the ear are so displaced that engagement of at least one outwardly extending hook in the inner band portion in the corresponding aperture of the outer band portion is assured before the ear is plastically deformed.

40. A method according to claim 39, wherein the pincer-like nose portion of one further jaw-like member is caused to engage with the leg of the ear opposite the free end of the outer band portion before the oppositely disposed pincer-like nose portion engages with the other leg portion.

* * * * *